(12) United States Patent
Hunter et al.

(10) Patent No.: US 9,052,803 B2
(45) Date of Patent: Jun. 9, 2015

(54) SMART PROGRESS INDICATOR

(71) Applicant: Apple Inc., Cupertino, CA (US)

(72) Inventors: Nicolas M. Hunter, Mountain House, CA (US); Scott D. Sivi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/286,840

(22) Filed: May 23, 2014

(65) Prior Publication Data

US 2014/0344746 A1    Nov. 20, 2014

Related U.S. Application Data

(63) Continuation of application No. 13/437,768, filed on Apr. 2, 2012, now Pat. No. 8,738,665.

(51) Int. Cl.
  *G06F 17/30* (2006.01)
  *G06F 3/0484* (2013.01)
  *G06F 3/0481* (2013.01)

(52) U.S. Cl.
  CPC ............ *G06F 3/0484* (2013.01); *G06F 3/0481* (2013.01)

(58) Field of Classification Search
  USPC ............... 707/2, 3, 805; 709/219; 348/333.02
  See application file for complete search history.

(56) References Cited

U.S. PATENT DOCUMENTS

| | | | |
|---|---|---|---|
| 7,774,811 B2 | 8/2010 | Poslinski et al. | |
| 8,086,262 B2 | 12/2011 | Doi et al. | |
| 8,212,910 B2 * | 7/2012 | Ota et al. ................ | 348/333.02 |
| 8,413,064 B2 | 4/2013 | Bauer | |
| 2006/0212329 A1 | 9/2006 | Lucas et al. | |
| 2010/0162139 A1 | 6/2010 | Beebe et al. | |
| 2011/0055209 A1 | 3/2011 | Novac et al. | |
| 2011/0154213 A1 | 6/2011 | Wheatley et al. | |
| 2012/0293327 A1 | 11/2012 | Mountain | |

FOREIGN PATENT DOCUMENTS

WO       2007/031909       3/2007

* cited by examiner

*Primary Examiner* — Etienne Leroux
(74) *Attorney, Agent, or Firm* — Fish & Richardson P.C.

(57) ABSTRACT

Methods, program products, and systems for a smart progress indicator are described. A smart progress indicator can be user-configurable and user-programmable. A smart progress indicator can represent a ratio between a completed portion of a task and the whole task. In addition, the smart progress indicator can include triggers such that the smart progress indicator can have different colors or patterns depending on whether or not one or more conditions are satisfied. In some implementations, the smart progress indicator can dynamically change data sources for the completed portion of the task or for the whole task based on the conditions.

33 Claims, 6 Drawing Sheets

SMART PROGRESS INDICATOR

TECHNICAL FIELD

This disclosure relates generally to graphical user interfaces for databases.

BACKGROUND

In a database application program that has a graphical user interface, a progress bar is often utilized to indicate progress of a task. The progress bar can have a rectangular shape that includes a filled portion and an unfilled portion. The length of the rectangular shape can correspond to a task. The filled portion can represent portions of the task that have been completed. The unfilled portion can represent portions of the task that have not been completed. The progress bar can be associated with a data field in a database.

SUMMARY

Methods, program products, and systems for a smart progress indicator are described. A smart progress indicator can be user-configurable and user-programmable. A smart progress indicator can represent a ratio between a completed portion of a task and the whole task. In addition, the smart progress indicator can include triggers such that the smart progress indicator can have different colors or patterns depending on whether or not one or more conditions are satisfied. In some implementations, the smart progress indicator can dynamically change data sources for the completed portion of the task or for the whole task based on the conditions.

In some implementations, a system can receive an input for creating a progress indicator. The progress indicator, e.g., a progress bar, can be a graphical indication of a ratio between a portion and a whole. The system can associate a graphical item with a trigger that includes a user-configurable condition, such that when the configurable condition is satisfied, a data source for the portion and a data source of the whole are determined, and a display pattern of the progress indicator corresponding to the ratio is applied. When the configurable condition is satisfied, the system can designate the data source of the portion and the data source of the whole, and then provide the graphical item for display as the progress indicator according to the display pattern and based on the data source of the portion and the data source of the whole.

A smart progress indicator can be implemented to achieve the following advantages over a conventional progress indicator. A smart progress indicator can provide more information than a conventional progress indicator. For example, a smart progress indicator can have different colors or shades for different portions of a task, or different colors or shades before or after a milestone date. A smart progress indicator can be personalized such that the smart progress indicator, once created, can have different appearances for different users.

The details of one or more implementations of a smart progress indicator are set forth in the accompanying drawings and the description below. Other features, aspects, and advantages of smart progress indicators will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
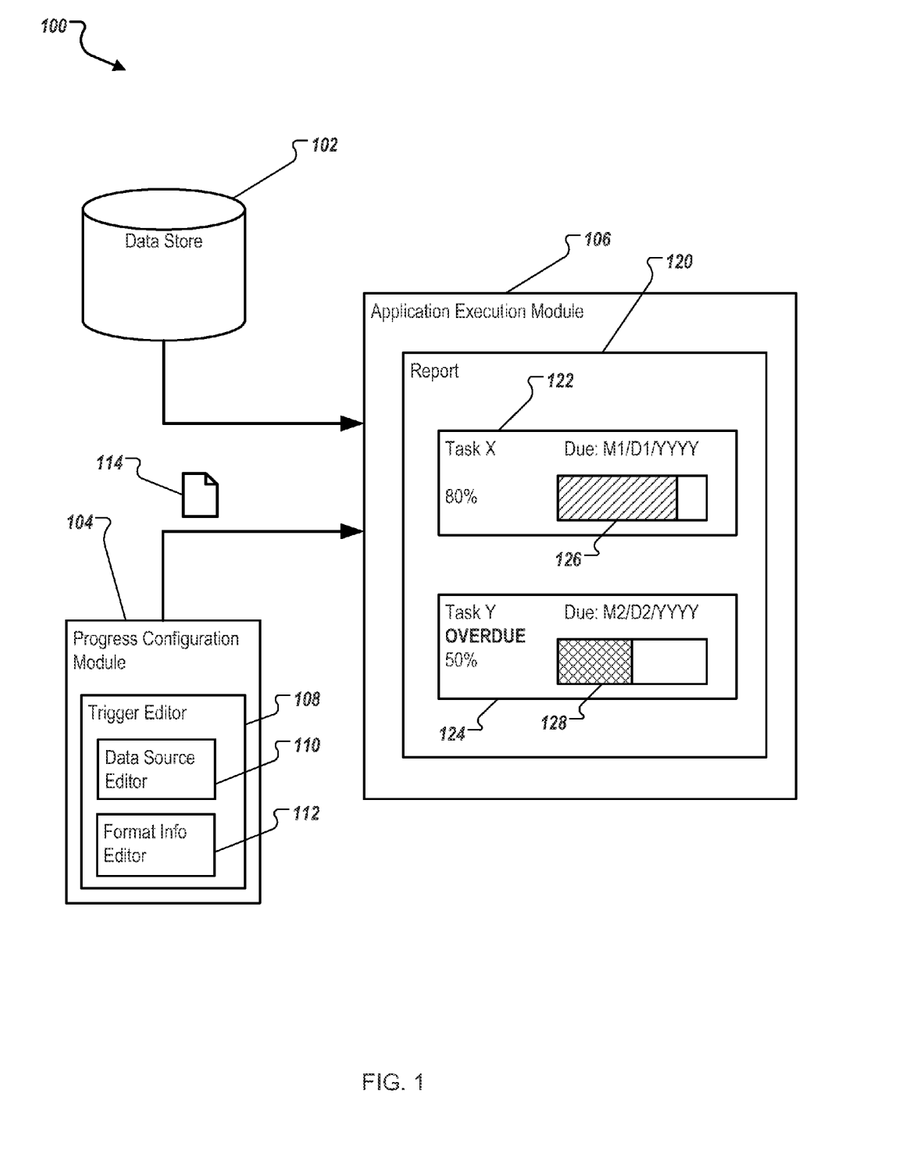
FIG. 1 provides an overview of smart progress indicators.

FIG. 1 provides an overview of smart progress indicators. System 100 is an exemplary system programmed to perform operations that include creating, configuring, and displaying smart progress indicators. System 100 can include data store 102, application configuration module 104, and application execution module 106. Data store 102, application configuration module 104, and application execution module 106 can include hardware, or program instructions that execute on one or more computers.

Data store 102 can store data including information on task X and task Y. Each of task X and task Y can include multiple subcomponents, e.g., sub-tasks. A task progresses when the number of completed subcomponent increases. The task is completed when all subcomponents of the task are completed.

Progress configuration module 104 can be a component of system 100 programmed to perform operations that include designing or configuring a smart progress indicator for a database application program. Progress configuration module 104 can include an interface, e.g., a graphical user interface, for configuring the smart progress indicator. Progress configuration module 104 can include trigger editor 108. In a smart progress indicator, a trigger can include one or more configurable conditions associated with data, e.g., task X and task Y, such that the progress indicator can change display patterns or behaviors when the one or more configurable conditions are satisfied.

In some implementations, trigger editor 108 can include data source editor 110 and format information editor 112. Data source editor 110 can receive a user input and, based on the user input, specify one or more data sources for a smart progress indicator. Unlike a conventional progress indicator, a smart progress indicator can change data sources dynamically, when a configurable condition is satisfied. Such ability can allow a progress indicator to represent progress of a task when there are multiple paths of completing task. For example, a task may have a critical subcomponent the outcome of which determines which series of subsequent subcomponents (e.g., "plan A" or "plan B") are to be performed to complete the task. A smart progress indicator can be configured to use the outcome of the critical subcomponent as a condition. The smart progress indicator can automatically select a path corresponding to "plan A" or a path corresponding to "plan B" based on the outcome.

In some implementations, the configurable condition of a smart progress indicator can correspond to a due date. A task can include different paths based on whether a critical subcomponent is completed by the due date. For example, a task can have a branch where "plan A" will be followed when the critical subcomponent is completed by the due date, and "plan B" will be followed if otherwise. Data source editor 110 can be configured to receive a user input specifying the configuration condition, such that, based on whether the critical subcomponent is completed by the due date, the smart progress indicator automatically select subcomponents of "plan A" or subcomponents of "plan B" without user intervention.

Format information editor 112 can be configured to receive a user input specifying formatting rules associated with a configurable condition. A smart progress indicator can change display schemes to indicate different characteristics of subcomponents of a task. For example, a progress bar can use different colors, shades, or brightness settings to represent different series of subcomponents, e.g., "plan A" subcomponents and "plan B" subcomponents of a task.

In some implementations, a smart progress indicator can change display types. Progress of a task can be represented as a progress bar, a progress pie chart, or other graphical representations. A progress pie chart can have a circular shape that represents the whole task, and one or more wedges in the circle that represent completed subcomponents of the task. Format information editor 112 can be configured to receive a user input specifying display types of a smart progress indicator such that, for example a progress bar can automatically change into a progress pie chart when a condition is satisfied.

Progress configuration module 104 can generate trigger 114 that includes the one or more conditions, one or more data sources, and formatting information. A first condition in trigger 114 can be based on whether the task is past due, e.g., when a subcomponent of the task has not been completed by a due date. A second condition in trigger 114 can be based on whether a given percentage of the task has been completed. Trigger 114 can be stored on a storage device as a component of a database application program.

Application execution module 106 can be programmed to execute the database application program. When application execution module 106 executes the database application program, application execution module 106 can read data from data store 102 and generate report 120. Report 120 can include data read from data store 102 formatted according to trigger 114 and other rules for formatting the data. Report 120 can be displayed on a display device.

Report 120 can include task status component 122 for exemplary task X and task status component 124 for exemplary task Y. Each of task status components 122 and 124 can include a progress indicator formatted according to trigger 114 and based on data on task X and task Y, respectively. Task status component 122 can include progress bar 126, a filled portion of which is displayed in a first color or pattern (e.g., green and in a slanted line pattern) according to the condition in trigger 114 and formatting information. Task status component 124 can include progress bar 128, a filled portion of which is displayed in a second color or pattern (e.g., red and in a checkered pattern) according to the condition in trigger 114 and formatting information. In the example shown, trigger 114 includes a condition on whether a task is past due. Task X is not past due; task Y is. Accordingly, the smart progress indicator can automatically display progress bar 126 and progress bar 128 in different colors and patterns.

Exemplary User Interface

Figure 2:
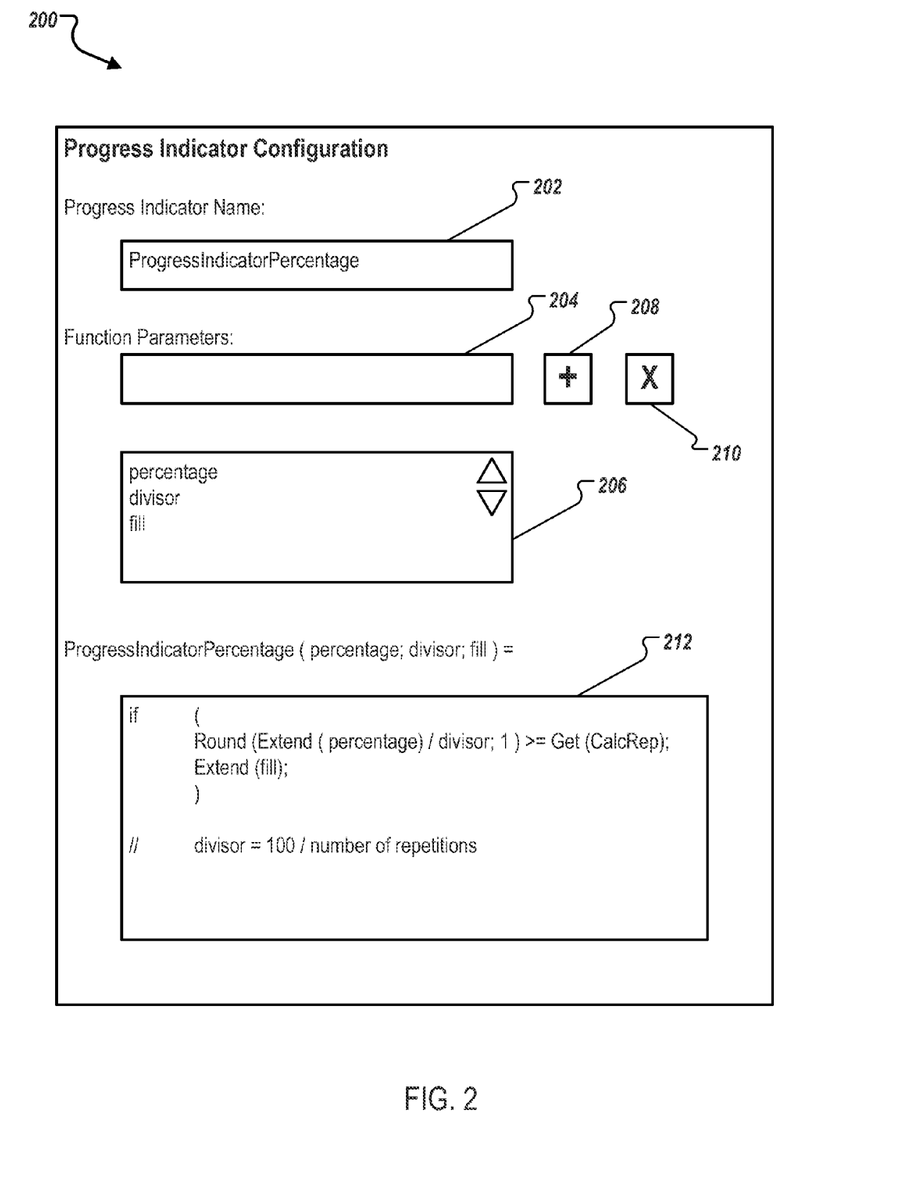
FIG. 2 illustrates an exemplary user interface for configuring a smart progress indicator.

FIG. 2 illustrates an exemplary user interface 200 for configuring a smart progress indicator. User interface 200 can be a user interface for trigger editor 108 of FIG. 1.

User interface 200 can include identifier editing field 202. Identifier editing field 202 can receive a user input for editing an identifier, e.g., a name, to be associated with a smart progress indicator.

User interface 200 can include parameter editing field 204. Parameter editing field 204 can receive a user input for editing a parameter for the smart progress indicator. The smart progress indicator can include a configurable condition that is based on the parameters. Each parameter can be individually configured and edited.

For example, a parameter "percentage" can be a variable that is linked to a data source that is indicative of the portion of a task that is completed. An editor for editing the "percentage" parameter can be an example of data source editor 110 of FIG. 1. A parameter "divisor" can be a variable or constant for configuring a precision in which progress of a task is measured. The parameter "divisor" can be used to determine a granularity of progression blocks to be used in a progress bar, or a granularity of progression wedges to be used in a progress pie chart. As more subcomponents of the task are completed, more progression blocks or wedges can be displayed. In some implementations, the parameter "divisor" can be calculated by dividing a constant c (e.g., 100) by a number of repetitions requested by a user. For a progress indicator showing n (e.g., 20) total progression blocks, the divisor can be set to c/n (e.g., 100/20=5). In these implementations, when there are more total progression blocks, the "divisor" value is smaller, indicating smaller granularity and higher precision in representing the progress. The "fill" parameter can specify content of the progress block. The content can include text, image, color, pattern, or any combination of the above. An editor for editing the "fill" parameter can be an example of format information editor 112 of FIG. 1.

Parameter editing field 204 can receive user input specifying a parameter. The parameter can then be added to parameter list field 206. A parameter in parameter list field 206 can be selected and edited. First parameter control 208, when activated, can cause the parameter specified in parameter editing field 204 to be added to parameter list field 206. Second parameter control 210, when activated, can cause a parameter selected in parameter list field 206 to be removed from parameter list field 206.

User interface 200 can provide an editing environment for editing a data source of a parameter or a value of a parameter in parameter list field 206. For example, user interface 200 can provide an editing environment for associating the "fill" parameter with a color, e.g., a red, green, blue (RGB) value, or a reference to an external file. The external file can be a static image file, an animated image file, or a video file. The data source can be a data field in a database table. The data field can store references multiple data sources, such that, when a configurable condition is satisfied, a new reference is used. For example, the data sources can include a series of progressively lighter-colored (or darker-colored) images such that the smart progress indicator becomes gradually lighter or darker as the number of subcomponents of a task increases.

User interface 200 can include function editing field 212. Function editing field 212 can receive user input for relating the parameters in parameter list field 206 to one another, or for relating a parameter in parameter list field 206 to an external function. For example, function editing field 212 can be utilized to create a function specifying that, if a "percentage" parameter indicating an amount of completed task divided by the "divisor" specifying number of repetitions is greater than a threshold, extend the filled portion of the smart progress indicator by a given amount. The threshold can be a dynamic value determined by an external process.

Function editing field 212 can be utilized to create a function that includes nested conditions and loops that can cause a smart progress indicator to behave in a complex manner to reflect complex nature of the underlying progress. These behaviors can include, for example, when certain conditions are satisfied, changing colors, changing display patterns, changing indicator types (e.g., from a bar indicator to a pie indicator), and changing manners of animation.

Exemplary Smart Progress Indicators

Figure 3A:
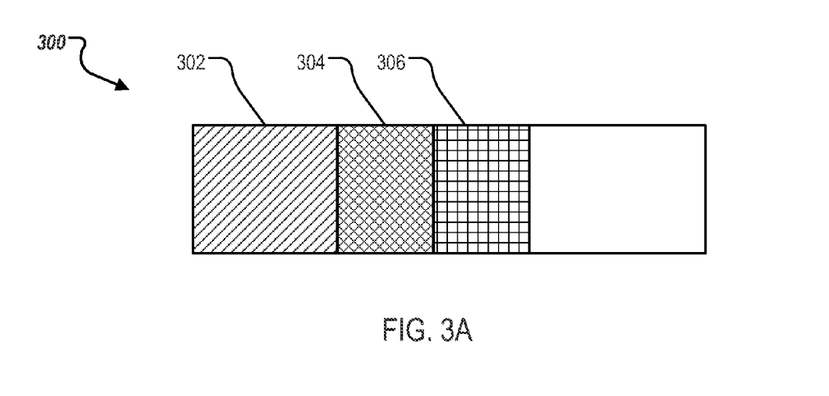
FIGS. 3A and 3B are exemplary smart progress indicators as displayed.

FIGS. 3A and 3B are exemplary smart progress indicators as displayed. FIG. 3A illustrates exemplary smart progress bar 300. A filled portion of smart progress bar 300 can have multiple colors and multiple display patterns. When a task begins to progress, the filled portion of smart progress bar 300 can have a first color and first pattern, as illustrated by section 302. When the task progresses to a point where a specified condition is satisfied, for example, when a due date has passed, or a pre-specified percentage of the task is completed, the filled portion of smart progress bar 300 after the condition is satisfied can have a second color and second pattern, as illustrated by section 304. When the task progresses to another point where another specified condition is satisfied, the filled portion of the smart progress bar 300 after the specified condition is satisfied can have a third color and third pattern, as illustrated by section 306. The colors, patterns, and conditions can be configurable through a user interface, e.g., user interface 200 of FIG. 2.

Figure 3B:
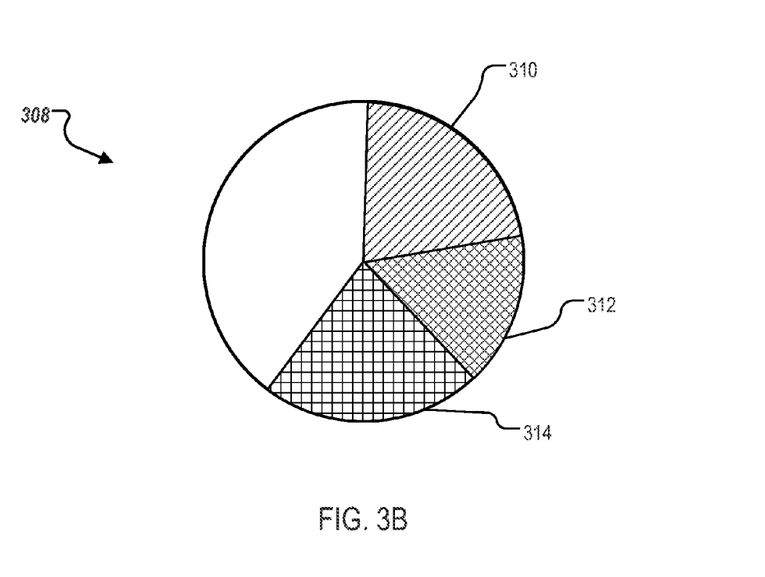

FIG. 3B illustrates exemplary smart progress pie chart 308. Smart progress pie chart 308 can start from empty at the beginning of a task. A filled portion of smart progress pie chart 308 can include one or more wedges the angles of which can grow as the task progresses. The wedges can expand clockwise or counter-clockwise. When a tasks starts from zero and progresses, the filled portion of smart progress pie chart can have a first color and a first pattern, as illustrated by wedge 310. When conditions specified in a trigger are satisfied, the first color and a first pattern can change to a second color and a second pattern as illustrated by wedge 312, and then to a third color and a third pattern as illustrated by wedge 314.

In some implementations, a smart progress indicator can be configured such that the smart progress indicator starts from smart progress bar 300 of FIG. 3A and changes to smart progress pie chart 308 of FIG. 3B, or vice versa, when one or more conditions are satisfied. In some implementations, whether a smart progress indicator is presented as smart progress bar 300 or smart progress pie chart 308 can be based one or more conditions. For example, a database application can include a trigger for a smart progress indicator such that the smart progress indicator appears in different types to users having different preferences, such that smart progress bar 300 is displayed to a first user, and smart progress pie chart 308 is displayed to a second user.

Exemplary System Components

Figure 4:
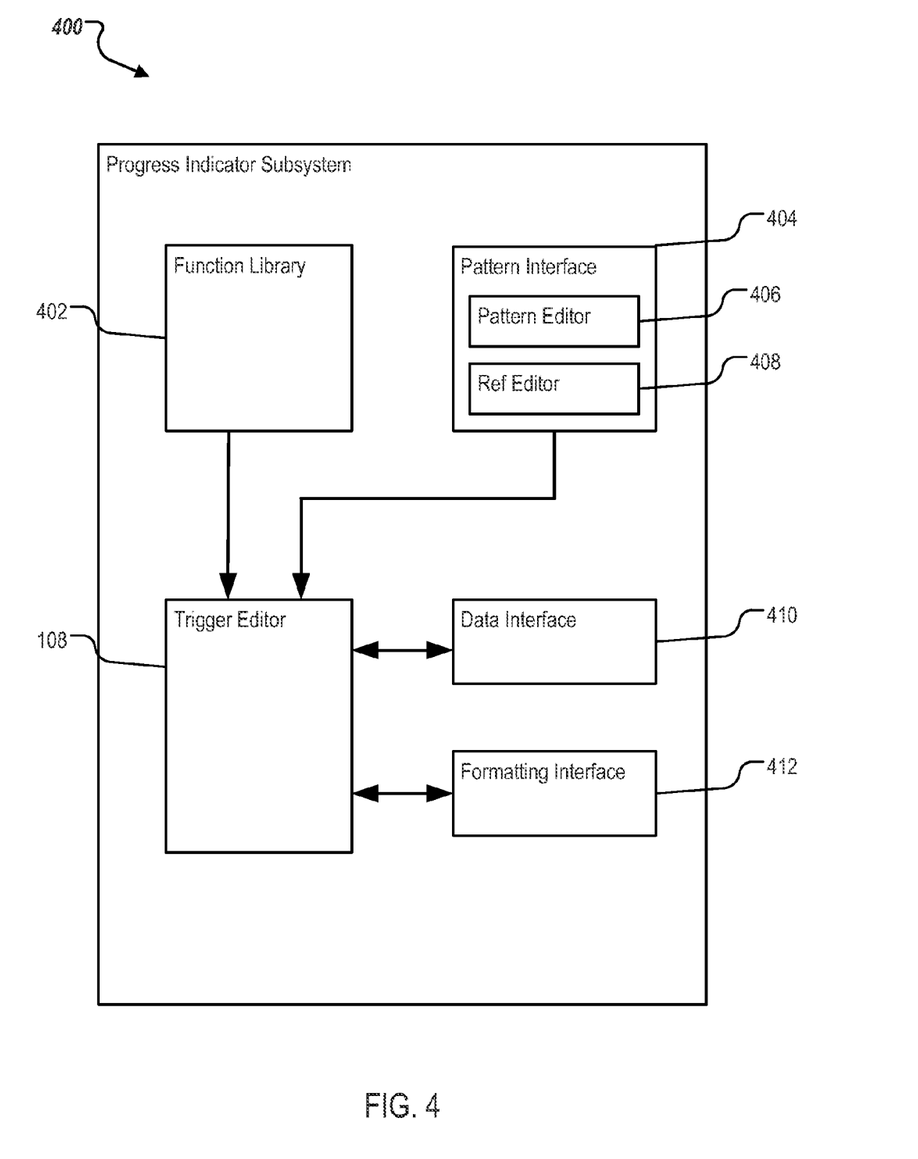
FIG. 4 is a block diagram of an exemplary system for smart progress indicators.

FIG. 4 is a block diagram of exemplary system 400 for smart progress indicators. System 400 can be an exemplary implementation of progress configuration module 104 of FIG. 1.

System 400 can include trigger editor 108 as described in reference to FIG. 1. Trigger editor 108 can interact with function library 402. Function library 402 can include one or more functions and operators that can serve as a resource for trigger editor 108. Trigger editor 108 can access function library 402 and use the functions and operators in function library 402 to construct configurable conditions of a smart progress indicator.

System 400 can include pattern interface 404. Pattern interface 404 is a component of system 400 that is configured to interface with text snippets, graphs, images, and patterns for display in smart progress indicator. Pattern interface 404 can support functions of trigger editor 108 for specifying a display pattern of a smart progress indicator.

Pattern interface 404 can include pattern editor 406, which can be configured to edit a graph, for example, by providing coordinates in an RGB color space for the graph. In addition, pattern editor 406 can be configured to edit a pattern of a graph. The pattern can include a fill pattern, a color of the fill pattern (which can be displayed on top of an underlying graph or image), or a transparency of the fill pattern.

Pattern interface 404 can include reference editor 408. Reference editor 408 can be configured to specify a reference, e.g., a file name or a data field name that points to an image file or video file. Content of the image file or video file can be displayed in a smart progress indicator in the filled portion, or as a background of the smart progress indicator. For example, in some implementations, a smart progress indicator can use an image of marked dial as a background, and use another image as a needle, where a position of the needle in the dial indicates an amount of the task that has been completed.

System 400 can include data interface 410. Data interface 410 can interface with one or more data stores (e.g., data store 102 of FIG. 1) and support functions of trigger editor 108 that specify a data source. For example, data interface 410 can provide a collection of identifiers such as database names, data table names, or data table column names to trigger editor 108. Trigger editor 108 can then provide these identifiers for use as parameters in a configurable condition.

System 400 can include formatting interface 412. Formatting interface 412 can interface with a layout for formatting data. A trigger created by trigger editor 108 can be stored as an object in a database application program and be inserted into a position in the layout. At run time when the database application program executes, a smart progress indicator can be displayed in a report at the position as specified in the layout.

Exemplary Process

Figure 5:
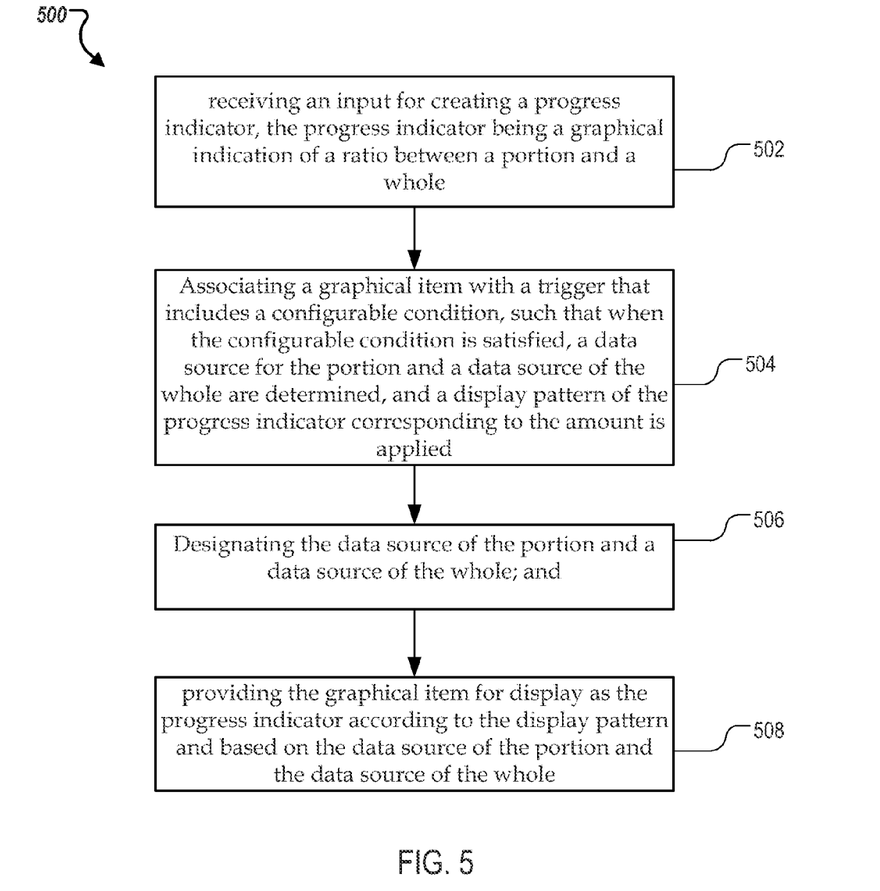
FIG. 5 is a flowchart illustrating an exemplary process of smart progress indicator operations.

FIG. 5 is a flowchart illustrating an exemplary process 500 of distributed join. A system, e.g., system 400 of FIG. 4, can receive (502) an input for creating a progress indicator, the progress indicator being a graphical indication of a ratio between a portion of a whole task and the whole task. The progress indicator can be a progress bar (e.g., smart progress bar 300 of FIG. 3) or a progress pie chart (e.g., smart progress pie chart 308 of FIG. 3), or a progress bar that can be switched to a progress pie chart when a condition is satisfied. The whole task can be a task having multiple subcomponents. The portion can be those subcomponents of the task that have been completed.

In some implementations, the progress indicator can be a bar having a filled portion and an unfilled portion. A ratio between a length of the filled portion and a total length of the bar can indicate underlying ratio between the portion and the whole. The filled portion can have multiple segments. Each segment can have one or more progression blocks. Each segment of the filled portion of the bar can have a distinct display pattern. The display pattern can include a shade pattern, a brightness pattern, or a color pattern.

The system can associate (504) a graphical item with a trigger that includes a configurable condition, such that when the configurable condition is satisfied, a data source for the portion and a data source of the whole are determined, and a display pattern of the progress indicator corresponding to the ratio between the portion and the whole is applied. The graphical item can be a graph, an image, an animated image, a video, or text. The configurable condition can include a configurable calculation and configurable trigger. The configurable calculation can use at least one of the data source of the portion (e.g., data source as specified in the "percentage" parameter of FIG. 2) or the data source of the whole (e.g., value of the "divisor" parameter of FIG. 2) as an input. The configurable calculation can produce one or more values as an output. The configurable trigger can specify at least one of the one or more values output by the configurable condition for comparing to a threshold.

In some implementations, the configurable condition can have a status parameter that has a binary data type, e.g., TRUE or FALSE. Each of the values of the status can correspond to a display pattern. For example, the trigger can specify that if a comparison between an output of the configurable calculation and a threshold results in TRUE, a first display pattern can be used; otherwise, a second display pattern can be used.

When the configurable condition is satisfied, the system can designate (506) the data source of the portion and a data source of the whole. In some implementations, at least one of the data source of the portion or the data source of the whole can correspond to a repeating field in a database. The repeating data field can be a data field containing multiple and separate values. For example, a task can include multiple subcomponents each of which corresponds to a repetition of data in the repeating field. The task can be complete when a number of repetitions reach a given threshold.

In addition, when the configurable condition is satisfied, the system can provide (508) the graphical item for display as the progress indicator according to the display pattern and based on the data source of the portion and the data source of the whole. In some implementations, the system can provide for display an editing area for receiving user input for editing the configurable condition. In some implementations, the system can be configured to import the configurable condition from a file or from an application program.

Exemplary System Architecture

Figure 6:
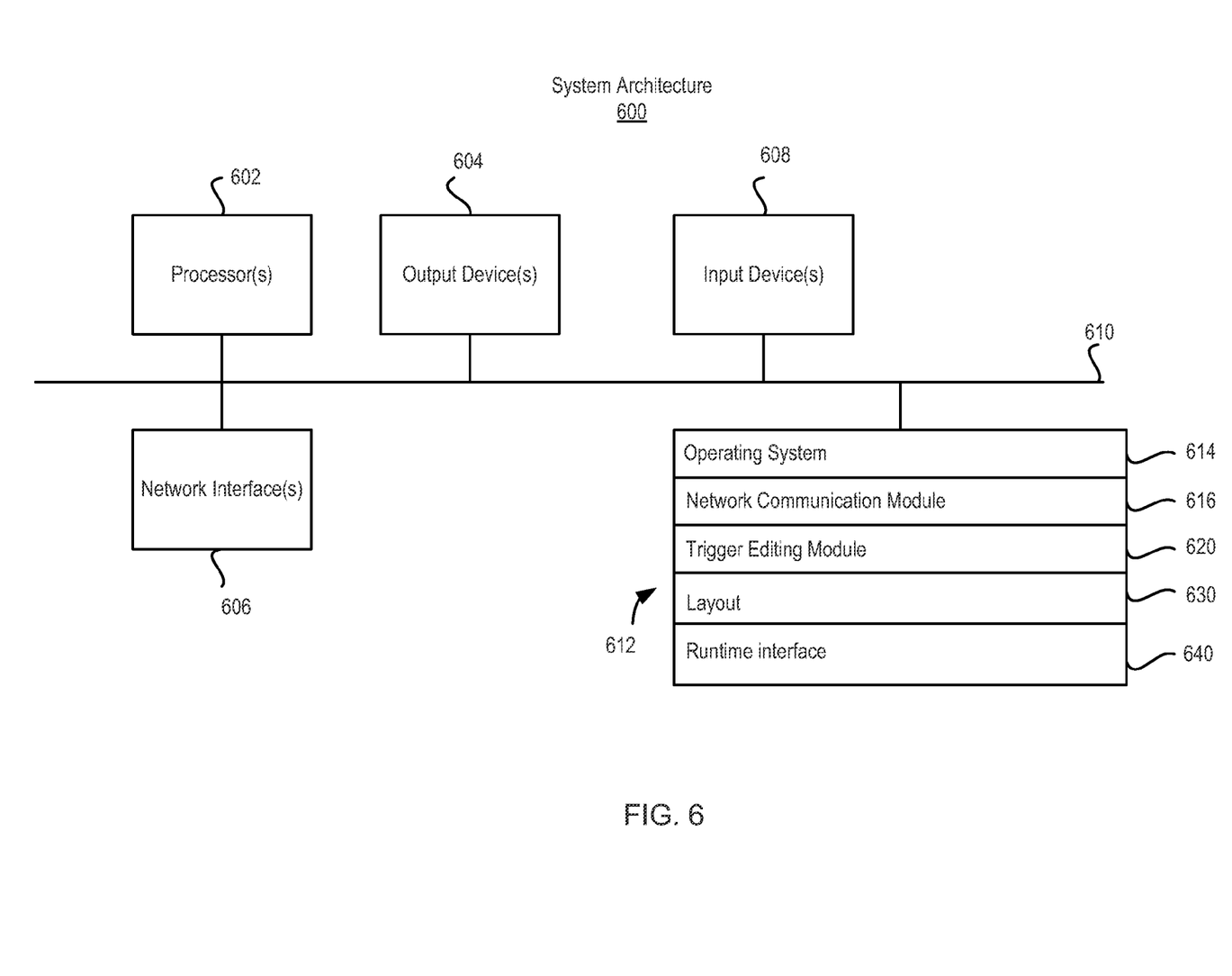
FIG. 6 is a block diagram of an exemplary system architecture for implementing the features and operations of FIGS. 1-5.

FIG. 6 is a block diagram of an exemplary system architecture 600 for implementing the features and operations of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, trigger editing module 620, layout 630, and runtime interface 640. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Trigger editing module 620 can include computer instructions that, when executed, cause processor 602 to configure a smart progress indicator. For example, the instructions can cause processor 602 to provide for display a user interface, e.g., user interface 200 of FIG. 2, for configuring a smart progress indicator. Layout 630 can include formatting information for displaying a smart progress indicator at specified or calculated locations in a report. Runtime interface 640 can include one or more database interface elements for retrieving dynamic or static data stored in a database in the display field when a database application program that includes a smart progress indicator executes.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or LED (light-emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
    associating a progress indicator with a trigger that includes a configurable condition on a data source of the progress indicator, the progress indicator indicating a progress on processing data of the data source;
    before the progress on processing the data of the data source satisfies the configurable condition, representing a completed portion of the progress in a first display color or first display pattern; and
    upon determining that the progress satisfies the configurable condition, triggering a change of the progress indicator, the change being different from increasing a portion of the progress indicator that represents the completed portion of the progress, the change including switching a representation of the completed portion of the progress from the first display color to a second display color or from the first display pattern to a second display pattern.

2. The method of claim 1, wherein the progress indicator is one of a progress bar or a progress pie chart.

3. The method of claim 1, wherein each of the first display pattern and the second display pattern comprises at least one of a shade pattern, a brightness pattern, or a color pattern.

4. The method of claim 1, wherein the configurable condition comprises a configurable calculation and a configurable trigger, the configurable calculation uses the data source as an input and produces one or more values as an output, the configurable trigger operable to specify at least one of the one or more output values for comparing to a threshold.

5. The method of claim 1, wherein the configurable condition includes a condition whether a task specified in the data of the data source is past due.

6. A method comprising:
    displaying a user interface for configuring a progress indicator for a group of one or more tasks, wherein displaying the user interface comprises:
        providing for display a parameter editing field configured for specifying a condition for selecting one or more data sources of the progress indicator, and for specifying a fill parameter that controls content of a progress block of the progress indicator, the progress block representing a completed portion of the one or more tasks; and
        providing for display a function editing field for receiving a definition of a function that relates parameters specified in the parameter editing field to one another or to an external function, including specifying that the content of the progress block changes when the condition is satisfied;

receiving one or more user inputs for specifying the condition, the fill parameter, and the definition of the function from the user interface; and associating the condition, the fill parameter, and the definition of the function as specified in the user input with the progress indicator.

7. The method of claim 6, wherein the parameter editing field is further configured for specifying a divisor parameter that controls granularity of the progress block representing the one or more tasks.

8. The method of claim 6, wherein the function editing field is configured to create a function specifying that, on condition that a division result of a percentage parameter indicating an amount of completed task divided by a divisor parameter specifying number of repetitions is greater than a threshold, extend the progress block by a given amount.

9. The method of claim 6, wherein the function editing field is configured to create a function that includes nested conditions.

10. The method of claim 9, wherein the function that includes nested conditions specifies that when the nested conditions are satisfied, changing colors, changing display patterns, or indicator types of the progress indicator.

11. The method of claim 10, wherein changing the indicator types of the progress indicator comprises changing the progress indicator from a progress bar indicator to a progress pie chart.

12. A system comprising:
one or more processors; and
a non-transitory storage device storing computer instructions operable to cause the one or more processors to perform operations comprising:
associating a progress indicator with a trigger that includes a configurable condition on a data source of the progress indicator, the progress indicator indicating a progress on processing data of the data source;
before the progress on processing the data of the data source satisfies the configurable condition, representing a completed portion of the progress in a first display color or first display pattern; and
upon determining that the progress satisfies the configurable condition, triggering a change of the progress indicator, the change being different from increasing a portion of the progress indicator that represents the completed portion of the progress, the change including switching a representation of the completed portion of the progress from the first display color to a second display color or from the first display pattern to a second display pattern.

13. The system of claim 12, wherein the progress indicator is one of a progress bar or a progress pie chart.

14. The system of claim 12, wherein each of the first display pattern and the second display pattern comprises at least one of a shade pattern, a brightness pattern, or a color pattern.

15. The system of claim 12, wherein the configurable condition comprises a configurable calculation and a configurable trigger, the configurable calculation uses the data source as an input and produces one or more values as an output, the configurable trigger operable to specify at least one of the one or more output values for comparing to a threshold.

16. The system of claim 12, wherein the configurable condition includes a condition whether a task specified in the data of the data source is past due.

17. A system comprising:
one or more processors; and
a non-transitory storage device storing computer instructions operable to cause the one or more processors to perform operations comprising:
displaying a user interface for configuring a progress indicator for a group of one or more tasks, wherein displaying the user interface comprises:
providing for display a parameter editing field configured for specifying a condition for selecting one or more data sources of the progress indicator, and for specifying a fill parameter that controls content of a progress block of the progress indicator, the progress block representing a completed portion of the one or more tasks; and
providing for display a function editing field for receiving a definition of a function that relates parameters specified in the parameter editing field to one another or to an external function, including specifying that the content of the progress block changes when the condition is satisfied;
receiving one or more user inputs for specifying the condition, the fill parameter, and the definition of the function from the user interface; and
associating the condition, the fill parameter, and the definition of the function as specified in the user input with the progress indicator.

18. The system of claim 17, wherein the parameter editing field is further configured for specifying a divisor parameter that controls granularity of the progress block representing the one or more tasks.

19. The system of claim 17, wherein the function editing field is configured to create a function specifying that, on condition that a division result of a percentage parameter indicating an amount of completed task divided by a divisor parameter specifying number of repetitions is greater than a threshold, extend the progress block by a given amount.

20. The system of claim 17, wherein the function editing field is configured to create a function that includes nested conditions.

21. The system of claim 20, wherein the function that includes nested conditions specifies that when the nested conditions are satisfied, changing colors, changing display patterns, or indicator types of the progress indicator.

22. The system of claim 21, wherein changing the indicator types of the progress indicator comprises changing the progress indicator from a progress bar indicator to a progress pie chart.

23. A non-transitory storage device storing computer instructions operable to cause one or more processors to perform operations comprising:
associating a progress indicator with a trigger that includes a configurable condition on a data source of the progress indicator, the progress indicator indicating a progress on processing data of the data source;
before the progress on processing the data of the data source satisfies the configurable condition, representing a completed portion of the progress in a first display color or first display pattern; and
upon determining that the progress satisfies the configurable condition, triggering a change of the progress indicator, the change being different from increasing a portion of the progress indicator that represents the completed portion of the progress, the change including switching a representation of the completed portion of the progress from the first display color to a second display color or from the first display pattern to a second display pattern.

24. The non-transitory storage device of claim 23, wherein the progress indicator is one of a progress bar or a progress pie chart.

25. The non-transitory storage device of claim 23, wherein each of the first display pattern and the second display pattern comprises at least one of a shade pattern, a brightness pattern, or a color pattern.

26. The non-transitory storage device of claim 23, wherein the configurable condition comprises a configurable calculation and a configurable trigger, the configurable calculation uses the data source as an input and produces one or more values as an output, the configurable trigger operable to specify at least one of the one or more output values for comparing to a threshold.

27. The non-transitory storage device of claim 23, wherein the configurable condition includes a condition whether a task specified in the data of the data source is past due.

28. A non-transitory storage device storing computer instructions operable to cause one or more processors to perform operations comprising:
  displaying a user interface for configuring a progress indicator for a group of one or more tasks, wherein displaying the user interface comprises:
    providing for display a parameter editing field configured for specifying a condition for selecting one or more data sources of the progress indicator, and for specifying a fill parameter that controls content of a progress block of the progress indicator, the progress block representing a completed portion of the one or more tasks; and
    providing for display a function editing field for receiving a definition of a function that relates parameters specified in the parameter editing field to one another or to an external function, including specifying that the content of the progress block changes when the condition is satisfied;
  receiving one or more user inputs for specifying the condition, the fill parameter, and the definition of the function from the user interface; and
  associating the condition, the fill parameter, and the definition of the function as specified in the user input with the progress indicator.

29. The non-transitory storage device of claim 28, wherein the parameter editing field is further configured for specifying a divisor parameter that controls granularity of the progress block representing the one or more tasks.

30. The non-transitory storage device of claim 28, wherein the function editing field is configured to create a function specifying that, on condition that a division result of a percentage parameter indicating an amount of completed task divided by a divisor parameter specifying number of repetitions is greater than a threshold, extend the progress block by a given amount.

31. The non-transitory storage device of claim 28, wherein the function editing field is configured to create a function that includes nested conditions.

32. The non-transitory storage device of claim 31, wherein the function that includes nested conditions specifies that when the nested conditions are satisfied, changing colors, changing display patterns, or indicator types of the progress indicator.

33. The non-transitory storage device of claim 32, wherein changing the indicator types of the progress indicator comprises changing the progress indicator from a progress bar indicator to a progress pie chart.

* * * * *